United States Patent
Ishika

(10) Patent No.: US 8,164,999 B2
(45) Date of Patent: Apr. 24, 2012

(54) OPTICAL DISC APPARATUS AND METHOD FOR DETERMINING INFORMATION RECORDING LAYER IN OPTICAL DISC

(75) Inventor: So Ishika, Yokohama (JP)

(73) Assignee: Toshiba Samsung Storage Technology Corporation, Kawasaki (JP)

( * ) Notice: Subject to any disclaimer, the term of this patent is extended or adjusted under 35 U.S.C. 154(b) by 663 days.

(21) Appl. No.: 11/863,628

(22) Filed: Sep. 28, 2007

(65) Prior Publication Data

US 2008/0175116 A1 Jul. 24, 2008

(30) Foreign Application Priority Data

Sep. 28, 2006 (JP) ................... 2006-265990

(51) Int. Cl.
*G11B 7/00* (2006.01)
(52) U.S. Cl. ..................... 369/53.23; 369/94
(58) Field of Classification Search .............. None
See application file for complete search history.

(56) References Cited

U.S. PATENT DOCUMENTS

| | | | | |
|---|---|---|---|---|
| 6,101,156 A | * | 8/2000 | Tanaka et al. | 369/44.28 |
| 2002/0159342 A1 | * | 10/2002 | Ogasawara et al. | 369/44.23 |
| 2003/0007431 A1 | * | 1/2003 | Tateishi | 369/44.23 |
| 2005/0157614 A1 | * | 7/2005 | Ichimura et al. | 369/44.27 |
| 2005/0199778 A1 | * | 9/2005 | Kadowaki et al. | 250/201.5 |

FOREIGN PATENT DOCUMENTS

| | | |
|---|---|---|
| JP | 8-185635 | 7/1996 |
| JP | 2005-25923 | 1/2005 |
| JP | 2005-122795 | 5/2005 |

* cited by examiner

*Primary Examiner* — Hoa T Nguyen
*Assistant Examiner* — Emily Frank
(74) *Attorney, Agent, or Firm* — Oblon, Spivak, McClelland, Maier & Neustadt, L.L.P.

(57) ABSTRACT

An optical disc device includes a laser diode which irradiates an optical disc having a plurality of layers with laser light, a photodetection section which detects laser light reflected by the optical disc, which comprising a pair of sub-photodetectors and a main photodetector provided between the pair of sub-photodetectors, a focus error signal generation circuit which generates a focus error signal from a photodetection signal output by the main photodetector, a tracking error generation circuit which generates a tracking error signal from the photodetection signal output by the main photodetector and a photodetection signal output by the pair of sub-photodetectors, and a layer determination signal processing circuit which generates a layer determination signal from the photodetection signal output by the pair of sub-photodetectors and determines in which of the layers a focus of the laser light is located, on the basis of the layer determination signal and focus error signal.

4 Claims, 8 Drawing Sheets

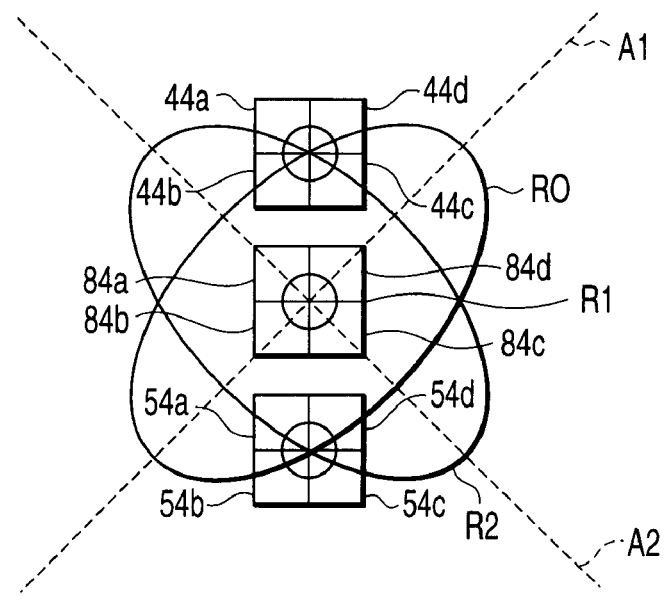
F I G. 4 A
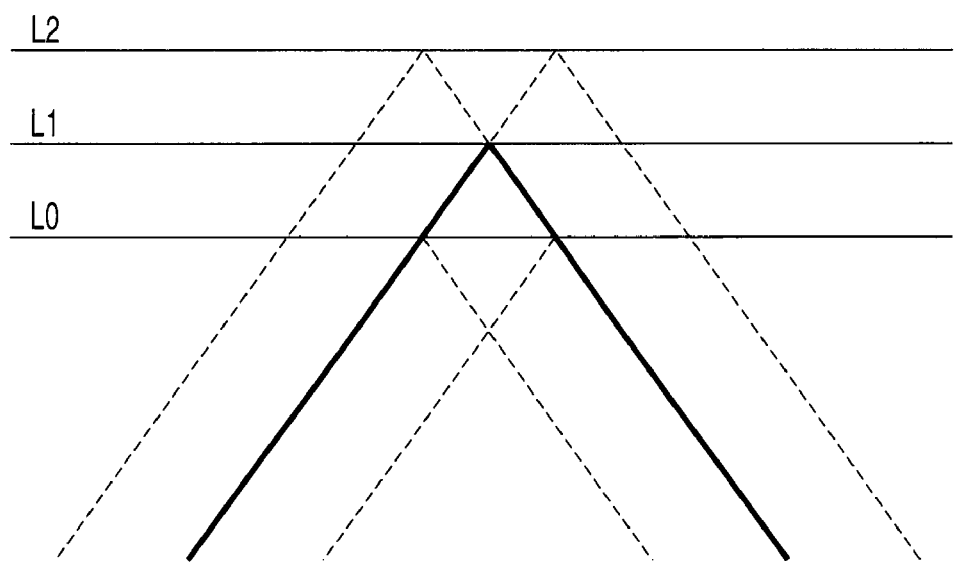
F I G. 4 B

OPTICAL DISC APPARATUS AND METHOD FOR DETERMINING INFORMATION RECORDING LAYER IN OPTICAL DISC

CROSS-REFERENCE TO RELATED APPLICATIONS

This application is based upon and claims the benefit of priority from prior Japanese Patent Application No. 2006-265990, filed Sep. 28, 2006, the entire contents of which are incorporated herein by reference.

BACKGROUND OF THE INVENTION

1. Field of the Invention

The present invention relates to an optical disc apparatus that reproduces information recorded on an optical disc having a plurality of information recording layers.

2. Description of the Related Art

Next-generation optical discs such as high definition digital versatile discs (HD DVD) have been emerging which follow digital versatile discs (DVD).

While DVD can have one or two information recording layers, HD DVD can have one to three information recording layers. To write and/or read data to and/or from an optical disc having at least two information recording layers, an optical disc device needs to execute a process of determining on which of the information recording layers laser light concentrated by an objective lens is converging (what is called a layer determination process).

Jpn. Pat. Appln. KOKAI Publication No. 2005-25923 discloses a technique for making determination on the information recording layer with a light receiver placed at a position different from the one where ordinary light receivers are located.

Disadvantageously, owing to the need to install the new light receiver, the invention of Jpn. Pat. Appln. KOKAI Publication No. 2005-25923 complicates the configuration of a light receiving section (what is called a photodetector).

BRIEF SUMMARY OF THE INVENTION

According to one aspect of the present invention, there is provided an optical disc device comprising: a laser diode which irradiates an optical disc having a plurality of layers with laser light; a photodetection section which detects laser light reflected by the optical disc, which comprising a pair of sub-photodetectors and a main photodetector provided between the pair of sub-photodetectors; a focus error signal generation circuit which generates a focus error signal from a photodetection signal output by the main photodetector; a tracking error generation circuit which generates a tracking error signal from the photodetection signal output by the main photodetector and a photodetection signal output by the pair of sub-photodetectors; and a layer determination signal processing circuit which generates a layer determination signal from the photodetection signal output by the pair of sub-photodetectors and determines in which of the layers a focus of the laser light is located, on the basis of the layer determination signal and focus error signal.

According to one aspect of the present invention, there is provided a method for layer determination, the method comprising: irradiating an optical disc with laser light; detecting laser light reflected by the optical disc using a pair of sub-photodetectors and a main photodetector provided between the pair of sub-photodetectors; and determining in which of the layers a focus of the laser is located, on the basis of a focus error signal generated from a photodetection signal output by the main photodetector and a layer determination signal generated from a photodetection signal output by the pair of sub-photodetectors.

BRIEF DESCRIPTION OF THE SEVERAL VIEWS OF THE DRAWING

FIG. 4A is a diagram showing the shape of reflected light having entered the photodetection section when the focus of the laser light is located near a layer L1 in the three-layer optical disc;

FIG. 4B is a diagram showing that the focus of laser light is located near the layer L1 in the three-layer optical disc;

DETAILED DESCRIPTION OF THE INVENTION

Embodiments of the present invention will be described below with reference to the drawings.

Figure 1:
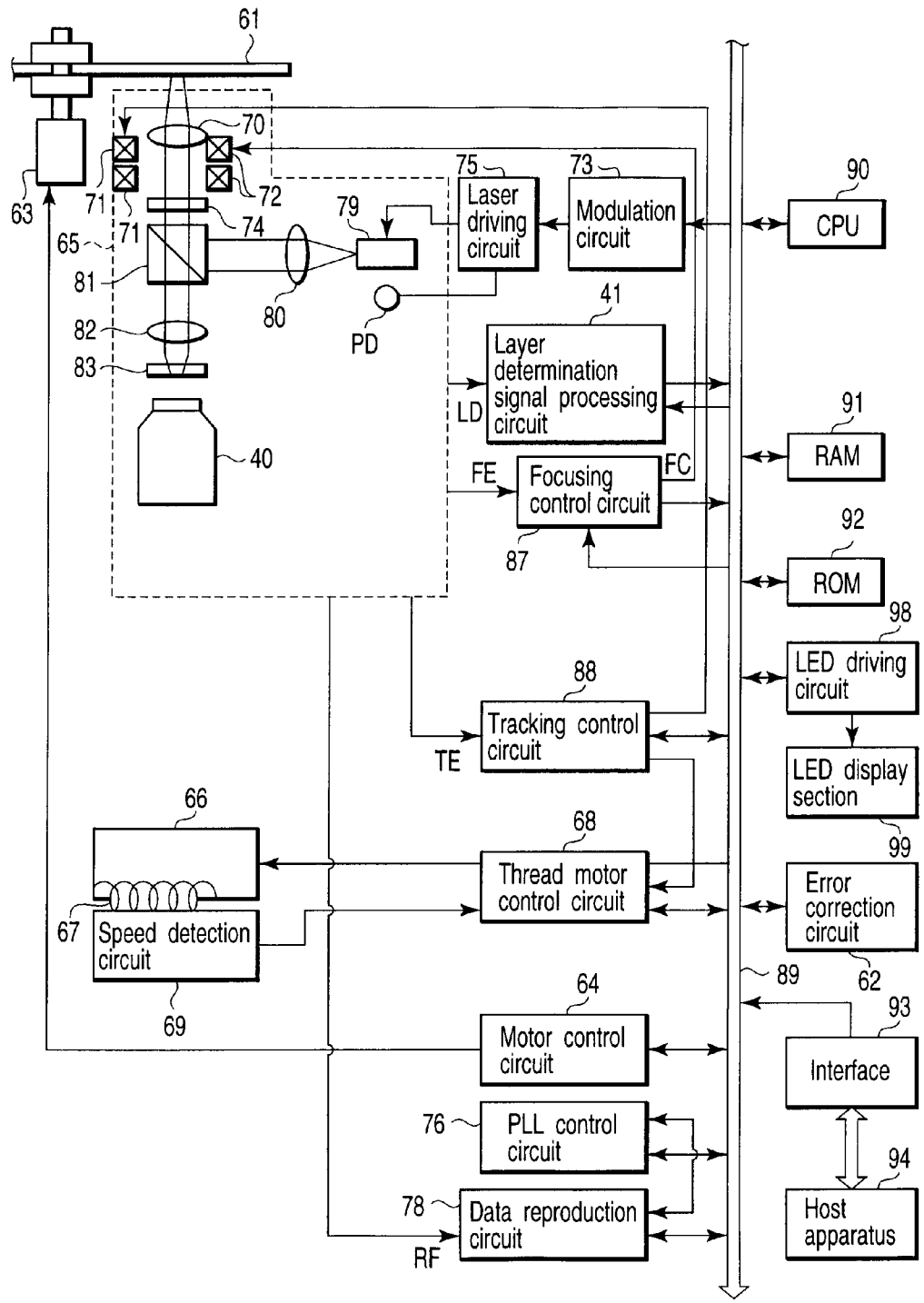
FIG. 1 is a block diagram showing the configuration of an optical disc apparatus in accordance with an embodiment of the present invention.

FIG. 1 is a block diagram showing the configuration of an optical disc device in accordance with an embodiment of the present invention.

User data is recorded on an optical disc 61 set in the optical disc device or the optical disc 61 is read only. However, in the description of the present embodiment, the optical disc is recordable and has multiple layers. The optical discs having an information recording surface comprising multiple layers include DVR-R. However, the present invention is not limited to these optical discs but any optical disc may be used as long as data can be recorded in its multiple layers.

Spiral round tracks and groove tracks are formed on the information recording surface of the optical disc 61. The optical disc 61 is rotationally driven by a spindle motor 63.

An optical pickup head 65 (enclosed by a dashed line in the left of the figure) records and reproduces information on and from the optical disc 61. The optical pickup head 65 is coupled to a thread motor 66 via a gear. The thread motor 66 is controlled by a thread motor control circuit 68.

A speed detection circuit 69 located below the thread motor 66 in the figure detects the speed of movement of the optical pickup head 65. The speed detection circuit 69 is connected to the thread motor control circuit 68. A speed signal from the optical pickup head 65 is detected by the speed detection circuit 69 and sent to the thread motor control circuit 68. A fixed portion of the thread motor 66 has a permanent magnet (not shown). A driving coil 67 is excited by the thread motor control circuit 68 to drive the optical pickup head 65 in a radial direction of the optical disc 61.

The optical pickup head 65 has an objective lens (first optical system) 70 (not shown) supported by, for example, a wire or a leaf spring. The objective lens 70 is driven by driving coils 71 and 72 to move in a tracking direction (which is orthogonal to the optical axis of the lens) and in a focusing direction (the direction of optical axis of the lens).

To record information on the optical disc 61, a modulation circuit 73 receives an information signal from a host apparatus 94 via an interface circuit 93, a bus 89, and RAM 91 to modulate the signal by means of a modulation scheme (for example, 8-16 modulation) specified for the optical disc 61. To record an information signal on the optical disc 61 (to form marks), a laser driving circuit 75 supplies a write signal to a semiconductor layer diode 79 on the basis of modulation data supplied by the modulation circuit 73. To reproduce an information signal, the laser driving circuit 75 supplies the semiconductor laser diode 79 with a read signal that is smaller than a write signal.

The semiconductor laser diode 79 generates laser light in response to a signal supplied by the laser driving circuit 75. Laser light emitted by the semiconductor laser diode 79 illuminates the optical disc 61 via a collimator lens 80, a half-prism 81, and the objective lens 70. Reflected light from the optical disc 61 is guided to a photodetection section 40 via the objective lens 70, a quarter-wavelength plate 74, the half-prism 81, a concentration lens 82, and an astigmatism sensor lens 83.

The semiconductor laser diode 79 comprises three semiconductor laser diodes that emit laser light for CDs (infrared; wavelength: 780 nm), for DVDs (red; wavelength: 650 nm), and for HD DVDs (bluish purple; wavelength: 405 nm). These semiconductor laser diodes may be accommodated in the same CAN package or may be accommodated in three independent CAN packages and individually placed on a base of the optical pickup head 65. The configuration and arrangement of the optical system are appropriately changed depending on the configuration of the semiconductor laser.

The objective lens 70, a component of the optical system, is designed to appropriately converge HD DVD laser light on the optical disc 61. The objective system also includes aberration correction elements (a diffraction element, a phase correction element, and the like) that inhibits aberration that may result from the use of both DVD laser light and CD laser light and numerical aperture limitation elements (a liquid crystal shutter, a diffraction element, and the like) that limits the numerical aperture of the objective lens when CD laser light is used.

Figure 2:
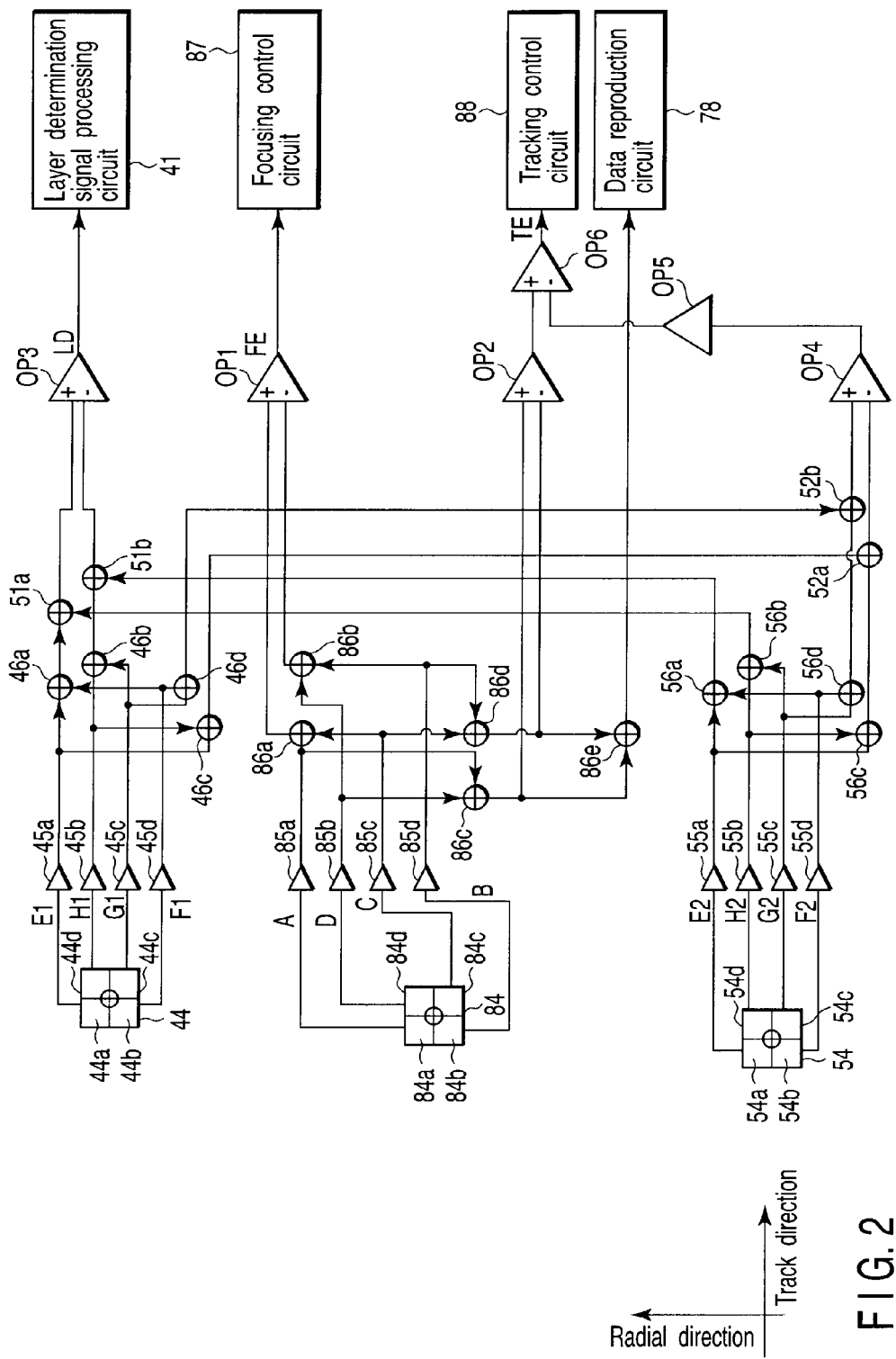
FIG. 2 is a block diagram showing the configuration of a photodetection section of the optical disc apparatus shown in FIG. 1 and a circuit that processes signals output by the photodetection section.

The photodetection section (light receiving section) 40 has a plurality of photodetectors 44, 84, and 54 as shown in FIG. 2, described below. Each of the photodetectors 44, 84, and 54 comprises, for example, four separate photodetection cells. The photodetection cells 44a to 44d, 84a to 84d, and 54a to 54d are separated from one another by parting lines in a track direction and parting lines in a radial direction.

The optical pickup head 65 generates a layer determination signal LD, a focus error signal FE, a tracking error signal TE, and an output sum signal (information signal) RF from signals detected by the photodetection cells 44a to 44d, 84a to 84d, and 54a to 54d of the photodetectors 44, 84, and 54, respectively. The layer determination signal LD is supplied to a layer determination signal processing circuit 41. The layer determination signal processing circuit 41 determines in which layer laser light is concentrated on the basis of the layer determination signal LD. The layer determination made by the layer determination signal processing circuit 41 is output to CPU 90 via the bus 89.

The focus error signal FE detected by the optical pickup head 65 is supplied to a focusing control circuit 87. An output signal FC from the focusing control circuit 87 is supplied to the focusing driving coil 72. The focusing driving coil 72 drivingly controls the objective lens 70, on the basis of the supplied output signal FC so that the recording surface of the optical disc 61 is always just in focus. The focusing driving circuit 87 also has a measurement function for measuring the amplitude of the focus error signal FE. The focusing driving circuit 87 outputs measurements to CPU 90 via the bus 89.

The tracking error signal TE detected by the optical pickup head 65 is supplied to a tracking control circuit 88. The tracking control circuit 88 generates a tracking driving signal in accordance with the tracking error signal TE. The tracking driving signal output by the tracking control circuit 88 is supplied to the tracking driving coil 71, which drives the objective lens 70 in the direction orthogonal to the optical axis. The tracking driving coil 71 drivingly controls the objective lens 70 so that laser light illuminates the recording surface of the optical disc 61 at a predetermined address position, on the basis of the supplied tracking driving signal. The tracking error signal TE is also supplied to the thread motor control circuit 68 via the tracking control circuit 88.

Focusing control and tracking control are performed as described above to provide a signal faithfully representing recording information on the basis of an output sum signal from the photodetection cells 84a to 84d of the main photodetector 84, that is, an output sum signal RF from an adder 86e that adds output signals from adders 86c and 86d together. The output sum signal RF is supplied to a data reproduction circuit 78.

Then, the data reproduction circuit 78 reproduces the read recorded data on the basis of a reproducing clock signal from a PLL circuit 76. The data reproduction circuit 78 has a measurement function of measuring the amplitude of the output sum signal RF. Measurements from the data reproduction circuit 78 are output to CPU 90 via the bus 89.

The thread motor control circuit 68 controls the thread motor 66 to move the main body of the optical pickup head 65 so that the objective lens 70 is located in the vicinity of a central position in the optical pickup head 65.

The following can be constructed within a single LSI chip: the motor control circuit 64, the thread motor control circuit 68, the modulation circuit 73, the laser driving circuit 75, the PLL control circuit 76, the data reproduction circuit 78, the focusing control circuit 87, the tracking control circuit 88, and so on. These circuits are controlled by a CPU 90 via the bus 89.

The CPU 90 generally controls the optical disc recording and reproducing apparatus in accordance with operation commands supplied by the host apparatus 94 via the interface circuit 93. The CPU 90 uses a RAM 91 as a work area to perform predetermined control in accordance with programs containing processes according to the present invention recorded in a ROM 92.

Now, the configuration of the photodetection section 40 will be described in detail with reference to FIG. 2.

The photodetection section 40 is composed of the main photodetector 84 and the sub-photodetectors 44 and 54. The main photodetector 84 is composed of, for example, the four separate photodetection cells 84a to 84d. Output signals from the photodetection cells 84a to 84d of the main photodetector 84 are supplied to adders 86a to 86d via current/voltage converting amplifiers 85a to 85d, respectively. The adder 86a adds outputs from the photodetection cells 84a and 84c together. The adder 86b adds outputs from the photodetection cells 84b and 84d together. The adder 86c adds outputs from the photodetection cells 84a and 84d together. The adder 86d adds outputs from the photodetection cells 84b and 84c together. Outputs from the adders 86a and 86b are supplied to a differential amplifier OP1. Outputs from the adders 86c and 86d are supplied to a differential amplifier OP2. The differential amplifier OP1 generates a focus error signal FE corresponding to the difference between output signals from the adders 86a and 86b. The focus error signal FE is supplied to the focusing control circuit 87.

When the output signals from the photodetection cells 84a to 84d are defined as A to D, the focus error signal $FE=(A+C)-(B+D)$.

The sub-photodetector 44 is composed of, four separate photodetection cells 44a to 44d. Output signals from the photodetection cells 44a to 44d of the photodetector 44 are supplied to adders 46a to 46d via current/voltage converting amplifiers 45a to 45d, respectively. The adder 46a adds outputs from the photodetection cells 44a and 44b together. The adder 46b adds outputs from the photodetection cells 44c and 44d together. The adder 46c adds outputs from the photodetection cells 44a and 44d together. The adder 46d adds outputs from the photodetection cells 44b and 44c together.

The sub-photodetector 54 is composed of, four separate photodetection cells 54a to 54d. Output signals from the photodetection cells 54a to 54d of the photodetector 54 are supplied to adders 56a to 56d via current/voltage converting amplifiers 55a to 55d, respectively. The adder 56a adds outputs from the photodetection cells 54a and 54b together. The adder 56b adds outputs from the photodetection cells 54c and 54d together. The adder 56c adds outputs from the photodetection cells 54a and 54d together. The adder 56d adds outputs from the photodetection cells 54b and 54c together.

Outputs from the adders 46a and 56b are supplied to an adder 51a. Outputs from the adders 46b and 56a are supplied to an adder 51b. Outputs from the adders 51a and 51b are supplied to a differential amplifier OP3. The differential amplifier OP3 generates a layer determination signal LD corresponding to the difference between output signals from the adders 51a and 51b. The layer determination signal LD is supplied to the layer determination signal processing circuit 41.

When output signals from the photodetection cells 44a to 44d are defined as E1, F1, G1, and H1 and output signals from the photodetection cells 54a to 54d are defined as E2, F2, G2, and H2, the layer determination signal $LD=(E1+F1)-(H1+G1)$ or $(E1+F1+H2+G2)-(H1+G1+E2+F2)$.

Outputs from the adders 46c and 56c are supplied to an adder 52a. Outputs from the adders 46d and 56d are supplied to an adder 52b. Outputs from the adders 52a and 52b are supplied to a differential amplifier OP4. The differential amplifier OP4 generates a signal corresponding to the difference between output signals from the adders 52a and 52b. An output from the differential amplifier OP4 is supplied to a gain amplifier OP5. The gain amplifier OP5 multiplies the output from the differential amplifier OP4 by a gain G to generate a signal.

Outputs from the differential amplifier OP2 and the gain amplifier OP5 are supplied to a differential amplifier OP6. The differential amplifier OP6 generates a tracking error signal TE corresponding to the difference between output signals from the differential amplifiers OP2 and OP5. The tracking error signal TE is supplied to the tracking control circuit 88.

The tracking error $TE=(A+D)-(B+C)-G\,[(E1+H1)-(F1+G1)]+[(E2+H2)-(F2+G2)]$.

The focusing control circuit 87 performs focusing control and the tracking control circuit 88 perform focusing control and tracking control to provide a signal faithfully representing recording information on the basis of the output sum signal from the photodetection cells 84a to 84d of the main photodetector 84, that is, the output sum signal RF from the adder 86e that adds the output signals from the adders 86c and 86d together. The output sum signal RF is supplied to the data reproduction circuit 78.

Now, the operation of the optical disc device will be described. It is assumed that the optical disc has three information recording layers L0, L1, and L2 arranged in this order as viewed from its laser light incident surface.

First, linearly polarized laser light emitted by the semiconductor laser diode 79 is converted into substantially parallel light by the collimator lens 80. The laser light subsequently strikes a diffraction grating. The diffraction grating forms three light beams, that is, a main beam, 0-order light S1, and sub-beams, +1-order light S2 and −1-order light S3, which are displaced in a tangential direction of the tracks in the optical disc 61 and in a radial direction by half a track. The three light beams are reflected by the half-prism 81 and enter the quarter-wavelength plate 74. The quarter-wavelength plate 74 converts the incident light into circularly polarized light. The three circularly polarized light beams are concentrated in the layers L0, L1, and L2 across a substrate (protective layer) of the optical disc 61 by the objective lens 70.

The three beams of the laser light concentrated in the respective layers L0, L1, and L2 are reflected by the layers L0, L1, and L2. The three light beams reflected by the respective layers are transmitted through the substrate of the optical disc 61 and the objective lens 70 and thus converted by the quarter-wavelength plate 74 into linearly polarized light different from that on the approach path. The light beams are then transmitted through the half-prism 81. The three light beams on the return path transmitted through the half-prism 81 enter the astigmatism sensor lens 83 through the concentration lens 82.

The astigmatism sensor lens 83 provides incident light with astigmatism by making a horizontal scale on the first axis of the incident light different from that on the second axis. Here, the "first axis" and "second axis" are defined to be perpendicular to the optical axis of laser light and to be orthogonal to each other. The laser light thus has different focal positions on the first axis and on the second axis. The three light beams exiting the astigmatism sensor lens 83 enter the photodetection section 40.

The three light beams provided with astigmatism are focused before entering the photodetection section 40 (closer the objective lens 70) and after passing through the photodetection section 40 (opposite the astigmatism sensor lens 83 with respect to the photodetection section 40). In the description below, a first axial direction refers to the axial direction of laser light having a focal position in front of the photodetection section 40, that is, in front of the position where the laser light is incident on the photodetection section 40. A second axial direction refers to the axial direction of laser light having a focal position behind the photodetection section 40. Adjustment is made of a part of the laser light provided with astigmatism by the astigmatism sensor lens 83 which is reflected by the layer where the focus is positioned so that this part forms a substantially circular condensation spot on the main photodetector 84, shown in FIG. 2. The first axial direction corresponds to a line joining the photodetection cells 84*a* and 84*c* together. The second axial direction corresponds to a line joining the photodetection cells 84*d* and 84*b* together.

In the photodetection section 40, the photodetection cells 44*a* to 44*d*, 54*a* to 54*d*, and 84*a* to 84*d* of the photodetectors 44, 84, and 54 detect laser light to generate a light quantity signal corresponding to the quantity of light detected.

The photodetection section 40 executes calculation on the basis of level of the light quantity signal to generate a layer determination signal LD. The photodetection section 40 also generates error signals such as the focus error signal FE and the tracking error signal TE as well as the information signal RF indicative of data. The photodetection section 40 determines, on the basis of at least the layer determination signal LD, near which of the layers L0, L1, and L2 of the installed optical disc 61 the focus of laser light is located. The focusing control circuit 87 and the tracking control circuit 88 passes a current through the driving coils 71 and 72 in accordance with the focusing signal FC and tracking error signal to drivingly move the objective lens 70 in the focus direction and in the tracking direction. This enables the focus formed in any of the layers of the optical disc 61 by the objective lens 70 to follow information tracks formed on the layer.

Now, description will be given of a method for layer determination using an optical disc device in accordance with the present embodiment.

The method for layer determination using an optical disc device in accordance with the present embodiment is intended to make determination on the layer L0. The reason is the need to identify the layer L0 in order to read data from a TOC area of the optical disc 61 installed in the optical disc device. The layer determination process can make determination not only on the layer L0 but also on the layer L1. In the description below, the optical disc has three information recording layers L0, L1, and L2 in this order as viewed from the objective lens (first optical system) 70.

Figure 3A:
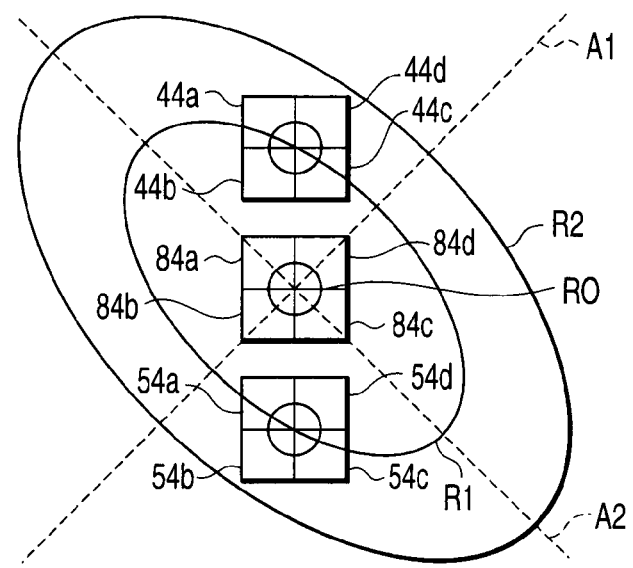
FIG. 3A is a diagram showing the shape of reflected light having entered the photodetection section when the focus of the laser light is located near a layer L0 in a three-layer disc.
Figure 3B:
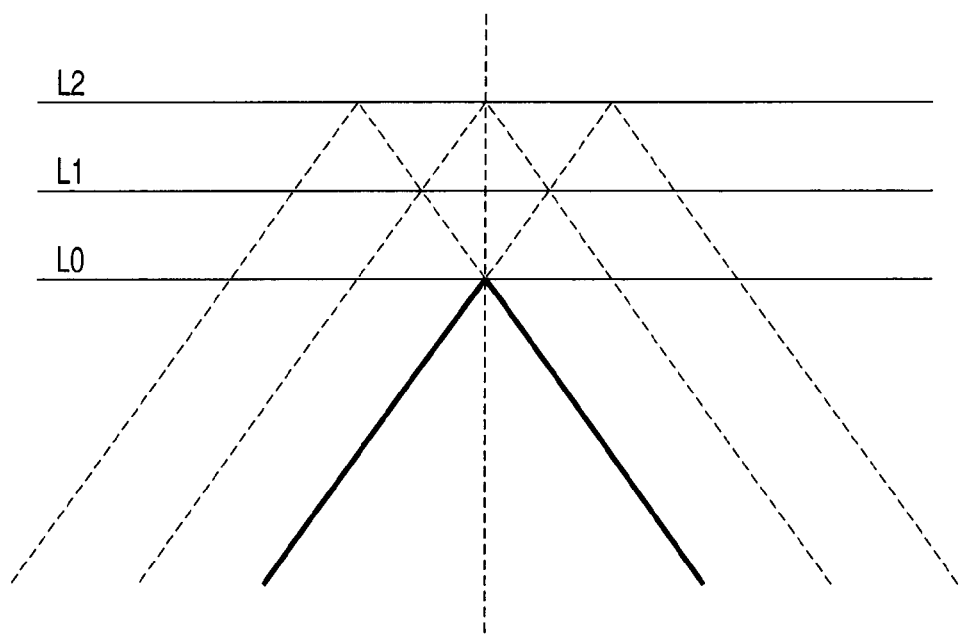
FIG. 3B is a diagram showing that the focus of laser light is located near the layer L0 in the optical disc 61.

FIG. 3A shows the shape of reflected light having entered the photodetection section 40 when the focus of the laser light is located near the layer L0 of the optical disc 61. FIG. 3B shows that the focus of laser light is located near the layer L0 of the optical disc 61.

Reflected light from the layer L0 forms a condensation spot R0 in any of the photodetection cells 84*a* to 84*d* of the main photodetector 84. At the same time, reflected light (stray light) from the layers L1 and L2 forms larger condensation spots R1 and R2 with lower light intensities. The condensation spots R1 and R2 converge with respect to the first axis A1 before entering the photodetection section 40. The elliptical condensation spot R1 mostly enters the cells 44*b* and 54*d*. The elliptical condensation spot R2 enters all the cells.

FIG. 3B does not show the shape of reflected light of sub-beams. Simulation based on the present embodiment indicates that only several % of the reflected light of sub-beams affects the layer determination signal LD. This in turn indicates that it is unnecessary to take the reflected light of sub-beams into account.

FIG. 4A shows the shape of reflected light having entered the photodetection section 40 when the focus of the laser light is located near the layer L1 of the optical disc 61. FIG. 4B shows that the focus of the laser light is located near the layer L1 of the optical disc 61.

Reflected light from the layer L1 forms a condensation spot R1 in any of the photodetection cells 84*a* to 84*d* of the main photodetector 84. At the same time, reflected light (stray light) from the layers L0 and L2 forms larger condensation spots R0 and R2 with lower light intensities.

The condensation spot R0 converges with respect to the second axis A2 before entering the photodetection section 40. The condensation spot R2 converges with respect to the first axis A1 before entering the photodetection section 40.

The elliptical condensation spot R0 mostly enters the cells 44*c* and 54*a*. The elliptical condensation spot R2 mostly enters the cells 44*b* and 54*d*. The shape of the condensation spot R0 corresponds to that of the condensation spot R2 rotated through 90°.

Figure 5A:
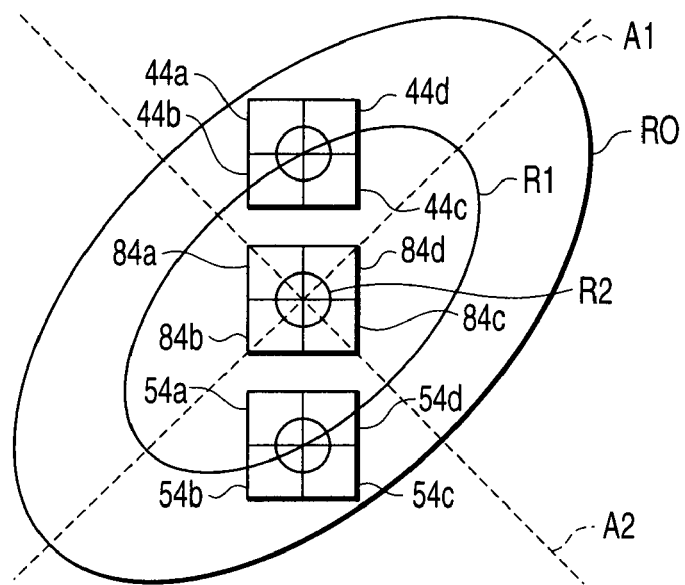
FIG. 5A is a diagram showing the shape of reflected light having entered the photodetection section when the focus of the laser light is located near a layer L2 in the three-layer optical disc.
Figure 5B:
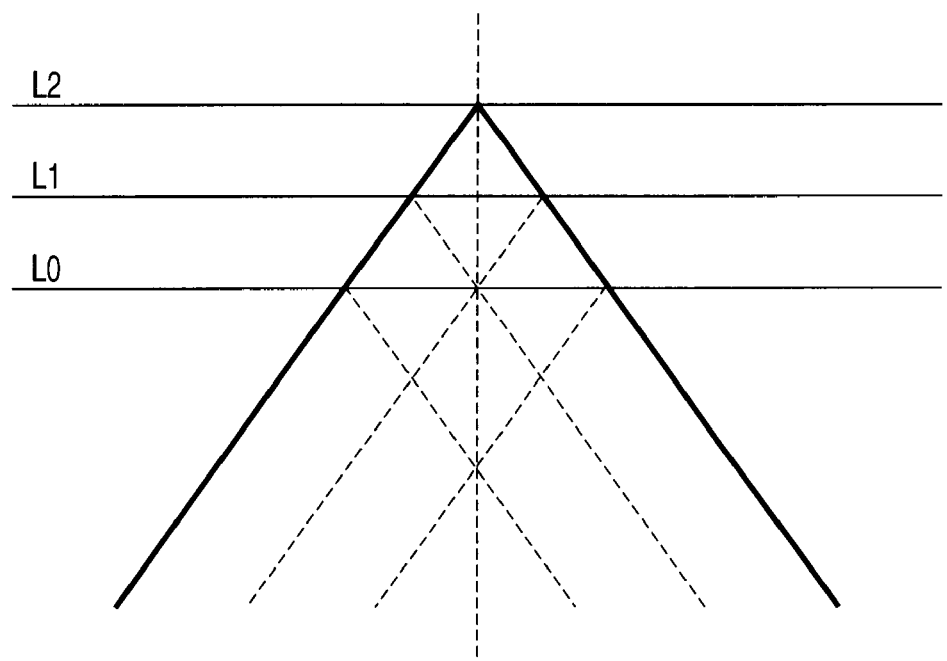
FIG. 5B is a diagram showing that the focus of laser light is located near the layer L2 in the three-layer optical disc.

FIG. 5A shows the shape of reflected light having entered the photodetection section 40 when the focus of the laser light is located near the layer L2 of the optical disc 61. FIG. 5B shows that the focus of laser light is located near the layer L2 of the optical disc 61.

Reflected light from the layer L2 forms a condensation spot R2 in any of the photodetection cells 84*a* to 84*d* of the main photodetector 84. At the same time, reflected light (stray light) from the layers L0 and L1 forms larger condensation spots R0 and R1 with lower light intensities. The condensation spots R0 and R1 converge with respect to the second axis A2 before entering the photodetection section 40. The elliptical condensation spot R1 mostly enters the cells 44*c* and 54*a*. The elliptical condensation spot R0 enters all the cells.

As described above, the determination signal LD=(E1+F1)−(H1+G1) or (E1+F1+H2+G2)−(H1+G1+E2+F2).

In the example in FIGS. 3A and 3B, showing that the focus of laser light is located in the layer L0 of the optical disc 61, LD>0. In the example in FIGS. 4A and 4B, showing that the focus of laser light is located in the layer L1 of the optical disc 61, LD=0. In the example in FIGS. 5A and 5B, showing that the focus of laser light is located in the layer L2 of the optical disc 61, LD<0.

Figure 6:
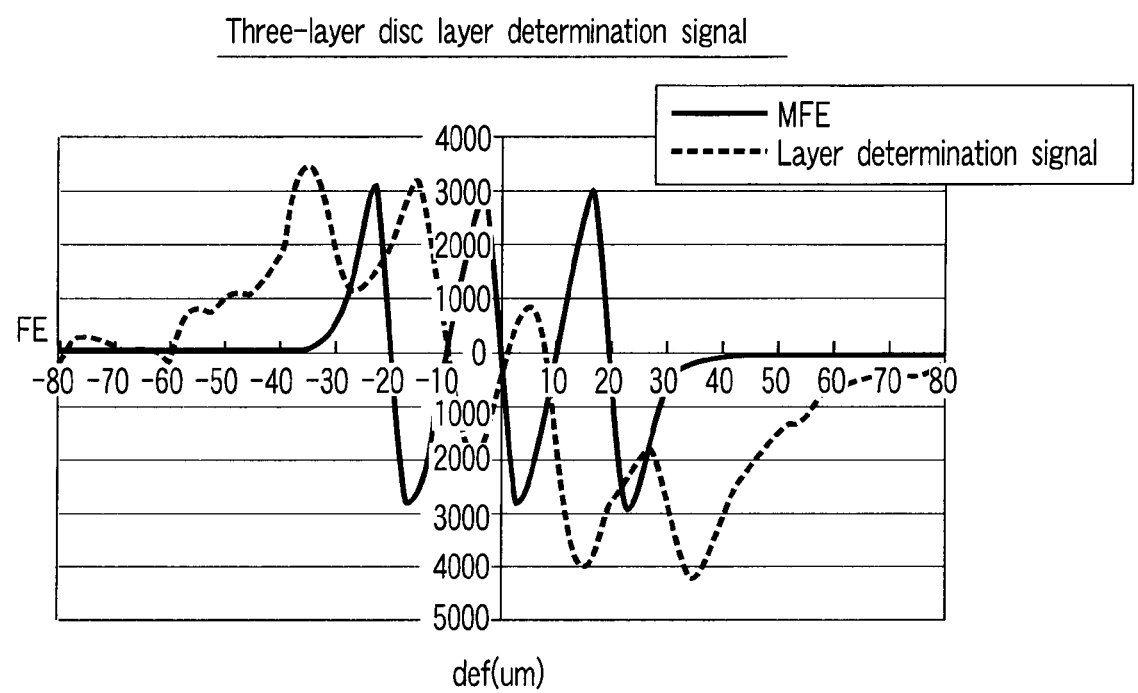
FIG. 6 is a diagram showing the calculation of a variation in focus error signal FE and layer determination signal LD (ordinate) with respect to the displacement of an objective lens (abscissa) for the three-layer optical disc.

FIG. 6 is a diagram showing the measurement of a variation in the focus error signal FE and the layer determination signal LD (ordinate) with respect to the displacement of the objective lens 70 (abscissa) for the three-layer optical disc.

As the position of the objective lens 70 is displaced, the focus error signal FE indicates how the focus approaches each layer, and after the layer comes just into focus, leaves that layer. This results in the appearance of a shape corresponding to the convergence of the focus on the information recording layer, that is, an S shape. Within the range of the S shape, a first zero cross point (in the left of FIG. 6) of the focus error signal FE corresponds to a convergence position of the layer L0. A second zero cross point (in the center of FIG. 6) of the focus error signal FE corresponds to a convergence position of the layer L1. A third zero cross point (in the right of FIG. 6) of the focus error signal FE corresponds to a convergence position of the layer L2.

As the objective lens 70 located sufficiently away from the optical disc 61 moves closer to the optical disc 61, the S shape for the layer L0 first appears in the focus error signal FE. Then the S shape for the layer L1 and finally the S shape for the layer L2 appear in the focus error signal FE. However, this is the detection result obtained under ideal conditions. When the optical disc 61 is subjected to side run-out during rotation, it is impossible to determine which layer has caused the appearance of the S shape.

The present embodiment thus utilizes the above layer determination signal LD. When the focus is present near the layer L0, the level of the layer determination signal is positive. When the focus is present near the layer L1, the level of the layer determination signal is almost zero. When the focus is present near the layer L2, the level of the layer determination signal is negative.

In the vicinity of zero cross point of the focus error signal FE, the focus is located near any of the layers L0, L1, and L2. Then, when the level of the layer determination signal LD is positive at a first just focus point (the vicinity of the zero cross point with FE=0) of the focus error signal FE, the layer determination signal processing circuit 41 can determine that the focus is present near the layer L0. When the level of the layer determination signal LD is almost zero at a second just focus point (the vicinity of the zero cross point with FE=0) of the focus error signal FE, the layer determination signal processing circuit 41 can determine that the focus is present near the layer L1. When the level of the layer determination signal LD is negative at a third just focus point (the vicinity of the zero cross point with FE=0), the layer determination signal processing circuit 41 can determine that the focus is present near the layer L2.

To achieve this, the layer determination signal processing circuit 41 can compare the layer determination signal LD with the focusing signal FC from the focusing control circuit 87 to easily determine on which layer the S shape having appeared in the waveform of the focus error signal FE is based. The layer determination signal LD thus enables the target layer for focus control to be determined before the focus control is actually performed. This enables a sharp reduction in the amount of time from what is called a standby state for drive startup until the actual recording or reproduction.

Now, description will be given of reflected light and a layer determination signal RE for an optical disc having two information recording layers.

Figure 7:
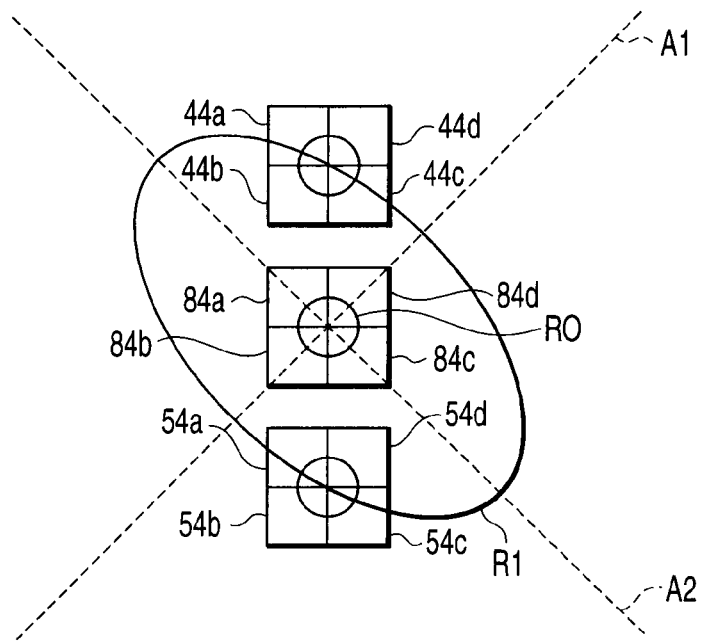
FIG. 7 is a diagram showing the shape of reflected light having entered the photodetection section when the focus of the laser light is located near the layer L1 in a two-layer optical disc.

FIG. 7 shows the shape of reflected light having entered the photodetection section 40 when the focus of the laser light is located near the layer L0 of the optical disc 61.

Reflected light from the layer L0 forms a condensation spot R0 in any of the photodetection cells 84a to 84d of the main photodetector 84. At the same time, reflected light (stray light) from the layer L1 forms a larger condensation spot R1 with a lower light intensity. The condensation spot R1 converges with respect to the first axis A1 before entering the photodetection section 40. The elliptical condensation spot R1 mostly enters the cells 44b and 54d.

Figure 8:
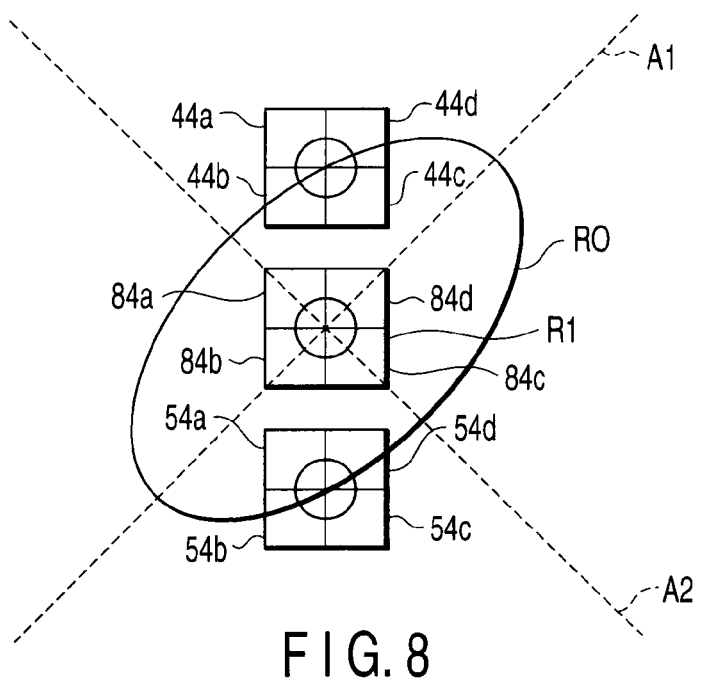
FIG. 8 is a diagram showing the shape of reflected light having entered the photodetection section when the focus of the laser light is located near the layer L1 in the two-layer optical disc.

FIG. 8 shows the shape of reflected light having entered the photodetection section 40 when the focus of the laser light is located near the layer L1 of the optical disc 61.

Reflected light from the layer L1 forms a condensation spot R1 in any of the photodetection cells 84a to 84d of the main photodetector 84. At the same time, reflected light (stray light) from the layer L0 forms a larger condensation spot R0 with a lower light intensity. The condensation spot R0 converges with respect to the second axis A2 before entering the photodetection section 40. The elliptical condensation spot R0 mostly enters the cells 44c and 54a.

As described above, the determination signal LD=(E1+F1)−(H1+G1) or (E1+F1+H2+G2)−(H1+G1+E2+F2).

In the example in FIG. 7, showing that the focus of laser light is located in the layer L0 of the optical disc 61, LD>0. In the example in FIG. 8, showing that the focus of laser light is located in the layer L1 of the optical disc 61, LD<0.

Figure 9:
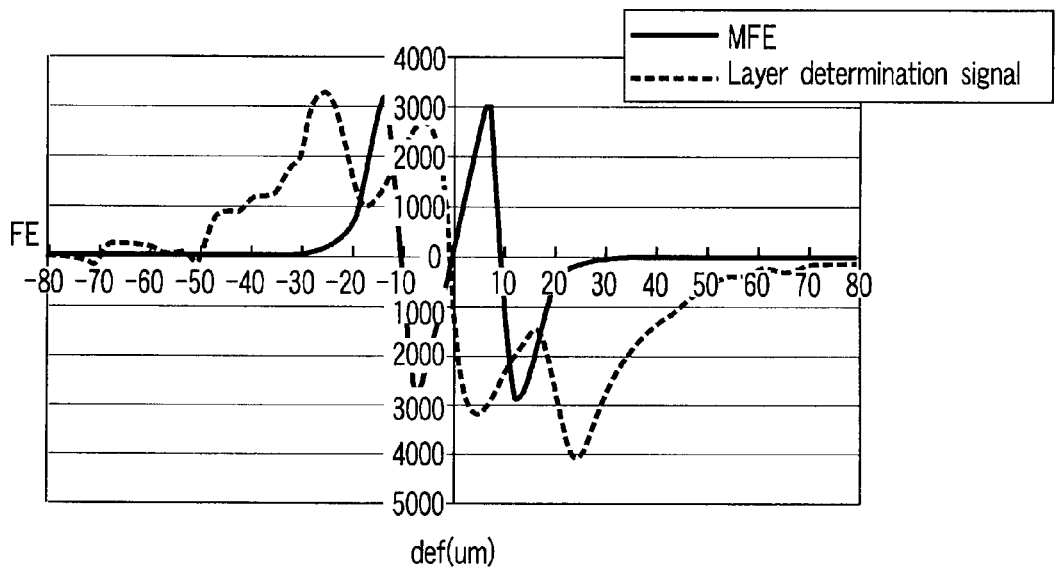
FIG. 9 is a diagram showing the calculation of a variation in focus error signal FE and layer determination signal LD (ordinate) with respect to the displacement of the objective lens (abscissa) for the two-layer optical disc.

FIG. 9 is a diagram showing the measurement of a variation in the focus error signal FE and the layer determination signal LD (ordinate) with respect to the displacement of the objective lens 70 (abscissa) for the two-layer optical disc.

As the position of the objective lens 70 is displaced, the focus error signal FE indicates how the focus approaches each layer, and after the layer comes just into focus, leaves that layer. This results in the appearance of a shape corresponding to the convergence of the focus on the information recording layer, that is, an S shape. Within the range of the S shape, a first zero cross point (in the left of FIG. 9) of the focus error signal FE corresponds to a convergence position of the layer L0. A second zero cross point (in the right of FIG. 9) of the focus error signal FE corresponds to a convergence position of the layer L1.

As the objective lens 70 located sufficiently away from the optical disc 61 moves closer to the optical disc 61, the S shape for the layer L0 first appears in the focus error signal FE. Then the S shape for the layer L1 appears in the focus error signal FE. However, this is the detection result obtained under ideal conditions. When the optical disc 61 is subjected to side run-out during rotation, it is impossible to determine which layer has caused the appearance of the S shape.

The present embodiment thus utilizes the above layer determination signal LD. When the focus is present near the layer L0, the level of the layer determination signal LD is positive. When the focus is present near the layer L1, the level of the layer determination signal LD is negative.

In the vicinity of zero cross point of the focus error signal FE, the focus is located near any of the layers L0, L1, and L2. Then, when the level of the layer determination signal LD is positive at a first just focus point (the vicinity of the zero cross point with FE=0) of the focus error signal FE, the layer determination signal processing circuit 41 can determine that the focus is present near the layer L0. When the level of the layer determination signal LD is negative at a second just focus point (the vicinity of the zero cross point with FE=0) of the focus error signal FE, the layer determination signal processing circuit 41 can determine that the focus is present near the layer L1.

To achieve this, the layer determination signal processing circuit 41 can compare the layer determination signal LD with the focusing signal FC from the focusing control circuit 87 to easily determine on which of the layers L0 and L1 the S shape having appeared in the waveform of the focus error signal FE is based. The layer determination signal LD thus enables the target layer for focus control to be determined before the focus control is actually performed. This enables a sharp reduction in the amount of time from what is called a standby state for drive startup until the actual recording or reproduction.

Figure 10:
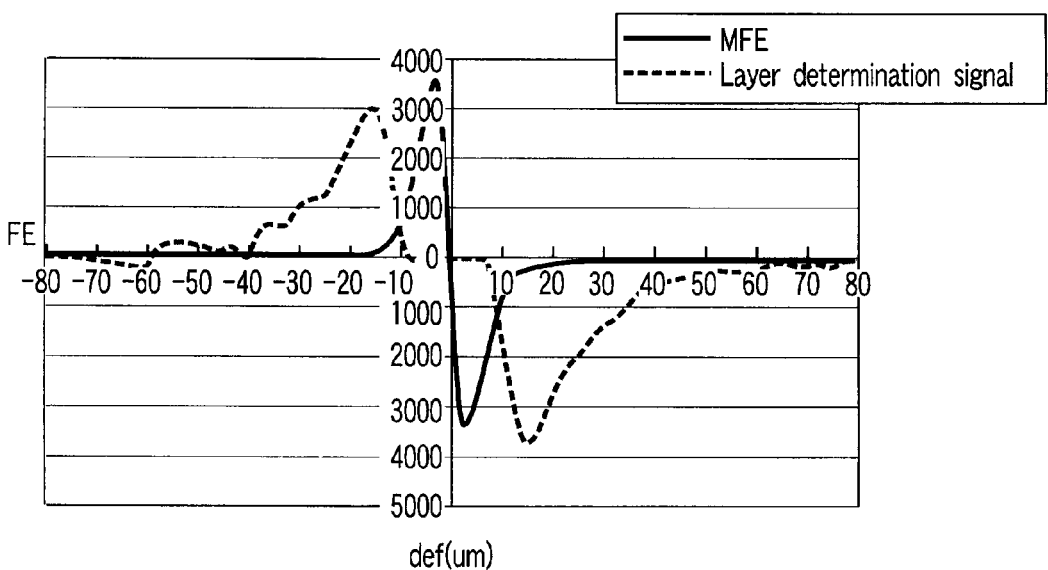
FIG. 10 is a diagram showing the calculation of a variation in focus error signal FE and layer determination signal LD (ordinate) with respect to the displacement of the objective lens (abscissa) for a single-layer optical disc.

FIG. 10 is a diagram showing the measurement of a variation in the focus error signal FE and the layer determination signal LD (ordinate) with respect to the displacement of the objective lens 70 (abscissa) for an optical disc having only one information recording layer. In this case, the zero cross point of the focus error signal FE corresponds to the convergence position of the layer L0. Accordingly, the circuit may detect that the level of the layer determination signal LD is 0.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disc device comprising:
  a laser diode configured to irradiate an optical disc having a layer L0 and a layer L1;
  a photodetection section configured to detect laser light reflected by the optical disc, which comprising a pair of sub-photodetectors and a main photodetector provided between the pair of sub-photodetectors;
  a focus error signal generation circuit configured to generate a focus error signal from a photodetection signal output by the main photodetector;
  a tracking error signal generation circuit configured to generate a tracking error signal based on the photodetection signal output by the main photodetector and photodetection signals output by the pair of sub-photodetectors; and
  a layer determination signal processing circuit configured to generate a layer determination signal from the photodetection signals output by the pair of sub-photodetectors and to determine in which of the layers a focus of the laser light is located on the basis of the layer determination signal and focus error signal, wherein the layer determination signal processing circuit is configured to determine that the focus is present in the layer L0 when the focus error signal corresponds to a first just focus point and the layer determination signal is positive, and to determine that the focus is present in the layer L1 when the focus error signal corresponds to a second just focus point and the layer determination signal is negative.

2. A method for layer determination, the method comprising:
  irradiating an optical disc having a layer L0 and a layer L1 with laser light;
  detecting laser light reflected by the optical disc using a pair of sub-photodetectors and a main photodetector provided between the pair of sub-photodetectors;
  generating a focus error signal from a photodetection signal output by the main photodetector;
  generating a tracking error signal based on the photodetection signal output by the main photodetector and photodetection signals output by the pair of sub-photodetectors; and
  determining in which of the layers a focus of the laser is located on the basis of a focus error signal generated from a photodetection signal output by the main photodetector and a layer determination signal generated from a photodetection signal output by the pair of sub-photodetectors, wherein the determining comprises determining that the focus is located in the layer L0 when the focus error signal corresponds to a first just focus point while the layer determination signal is positive, and determining that the focus is located in the layer L1 when the focus error signal corresponds to a second just focus point while the layer determination signal is negative.

3. An optical disc device comprising:
  a laser diode configured to irradiate an optical disc having a layer L0, a layer L1, and a layer L2;
  a photodetection section configured to detect laser light reflected by the optical disc, which comprising a pair of sub-photodetectors and a main photodetector provided between the pair of sub-photodetectors;
  a focus error signal generation circuit configured to generate a focus error signal from a photodetection signal output by the main photodetector;
  a tracking error signal generation circuit configured to generate a tracking error signal based on the photodetection signal output by the main photodetector and photodetection signals output by the pair of sub-photodetectors; and
  a layer determination signal processing circuit configured to generate a layer determination signal from the photodetection signals output from the pair of sub-photodetectors and to determine in which of the layers a focus of the laser light is located on the basis of the layer determination signal and focus error signal, wherein the layer determination signal processing circuit is configured to determine that the focus is present in the layer L0 when the focus error signal corresponds to a first just focus point and the layer determination signal is positive, wherein the layer determination signal processing circuit is configured to determine that the focus is present in the layer L1 when the focus error signal corresponds to a second just focus point and the layer determination signal is zero, and to determine that the focus is present in the layer L2 when the focus error signal corresponds to a third just focus point and the layer determination signal is negative.

4. A method for layer determination, the method comprising:
  irradiating an optical disc having a layer L0, a layer L1, and a layer L2 with laser light;
  detecting laser light reflected by the optical disc using a pair of sub-photodetectors and a main photodetector provided between the pair of sub-photodetectors;
  generating a tracking error signal based on the photodetection signal output by the main photodetector and photodetection signals output by the pair of sub-photodetectors; and
  generating a focus error signal from a photodetection signal output by the main photodetector; and
  determining in which of the layers a focus of the laser is located on the basis of a focus error signal generated from a photodetection signal output by the main photodetector and a layer determination signal generated from a photodetection signal output by the pair of sub-photodetectors, wherein the determining comprises determining that the focus is located in the layer L0 when the focus error signal corresponds to a first just focus point while the layer determination signal is positive, determining that the focus is located in the layer L1 when the focus error signal corresponds to a second just focus point while the layer determination signal is zero, and determining that the focus is located in the layer L2 when the focus error signal corresponds to a third just focus point, while the layer determination signal is negative.

* * * * *